United States Patent

[11] 3,627,869

| [72] | Inventor | Roger J. Walton |
| | | Bartlesville, Okla. |
| [21] | Appl. No. | 673,284 |
| [22] | Filed | Oct. 6, 1967 |
| [45] | Patented | Dec. 14, 1971 |
| [73] | Assignee | Phillips Petroleum Company |

[54] METHOD OF PRODUCING A LAMINATED POLYETHYLENE-POLYPROPYLENE ARTICLE
6 Claims, No Drawings

[52] U.S. Cl...................................... 264/255,
260/33.6 PO, 264/269, 264/310
[51] Int. Cl...................................... B29c 5/04
[50] Field of Search........................... 264/269,
311, 310, 312, 255; 161/252; 260/33.6 PO;
117/161 UH

[56] References Cited
UNITED STATES PATENTS

| 2,928,756 | 3/1960 | Campbell................ | 117/161 |
| 3,294,532 | 12/1966 | Brunson et al.......... | 117/161 |
| 3,340,091 | 9/1967 | Zweig..................... | 161/252 |
| 3,341,641 | 9/1967 | Spencer................... | 264/311 |

FOREIGN PATENTS

| 814,320 | 6/1959 | Great Britain............... | 264/85 |

Primary Examiner—Robert F. White
Assistant Examiner—Richard Shear
Attorney—Young and Quigg ABSTRACT: At least one of a homopolymer or copolymer of ethylene and another olefin such as propylene, butene-1 and higher up to about eight carbon atoms and a copolymer of propylene and ethylene are laminated together, for example, by rotational molding. The ethylene homopolymer and/or the ethylene copolymer is first laid down upon the mold surface whereupon the propylene-ethylene copolymer is laid as a second layer. When an ethylene copolymer is used, the comonomer is present in minor amount, for example, usually not over about 7 percent. The ethylene in the propylene copolymer usually will not exceed about 20 percent. Smaller than the percentages given are ordinarily quite satisfactory. Multiwalled articles produced with the laminates of invention exhibit good layer cohesiveness, high environmental stress cracking resistance and high impact resistance.

METHOD OF PRODUCING A LAMINATED POLYETHYLENE-POLYPROPYLENE ARTICLE

This invention relates to a laminate formed from at least two different thermoplastic materials. More specifically, it relates to such a laminate structure formed by rotational molding.

In one of its concepts the invention relates to a method of forming a laminate structure by first forming a layer of at least one of a homopolymer or copolymer of ethylene upon a heated surface and then while the layer so formed is above the softening temperature, forming thereon a cohesive layer comprising essentially a copolymer of propylene with ethylene. In another of its concepts the invention provides a rotationally molded laminate formed by first introducing at least one of a homopolymer or copolymer of ethylene into a rotational mold therein to form a layer of thermoplastic and, then, while said layer is still above the softening temperature, layering thereon in said mold a copolymer of propylene with another monomer, for example, ethylene and/or butene-1.

The formation of multiwalled articles is known. It has been suggested to combine a polyolefin such as polypropylene with a block copolymer. It is also known to impregnate within a rotating mold a mat of fibrous material with liquid resin and to cure the resin and, in one method of manufacture, to introduce a second volume of liquid resin into the mold when the resin previously injected into the mold begins to solidify. Further, it is known to place a pipe of uncrossed-linked polyethylene inside a pipe of cross-linked polyethylene and to heat fuse together the two parts. Still further, it is known to make decorative articles from thermoplastic plastisols by rotational casting in which as soon as a first application of plastisol has solidified, a charge of a second plastisol is floated over the mold surface and over the previously set plastisol or plastisols.

The present invention is concerned with a laminated structure comprising an outer layer and an inner layer which is more impact resistant than a structure made simply of a material of the inner layer, said structure also being more resistant to environmental stress cracking than a structure made of the outer layer. Specifically, the outer layer referred to is one selected from homopolymers and copolymers of ethylene. For example, when a copolymer is present it can be one obtained employing at least one of propylene and butene-1 as the comonomer although other comonomers may be employed. The inner layer is comprised essentially of a copolymer of propylene with ethylene. Articles with this structure are useful in applications demanding the combination of properties which it possesses. This is particularly so since the propylene copolymer is protected against degradation by heat by the, a priori, laid-down layer of polyethylene or copolymer of ethylene and another monomer.

It is known that rotationally molded polyethylene containers generally have comparatively poor environmental stress cracking resistance since it is necessary to use high melt index resins (minimum 3-4 melt index, but usually higher) in a conventional process. Several factors complicate rotationally molding laminated polyethylene-polypropylene structures. We have found that a satisfactory bond between layers can be obtained by using for outer skin a homopolymer of ethylene, an ethylene-1-butene copolymer or other copolymers as herein described and for the inner skin a propylene-ethylene copolymer. Especially in rotational molding in which powdered resin is used, polypropylene is sensitive to thermal degradation, large areas being exposed, and special attention is to be given to adequately protecting the resin. This is accomplished by furnishing suitable amounts of antioxidant and by providing an inert atmosphere, at least during the heating cycle.

It is an object of this invention to form a laminate. It is a further object of this invention to form a laminate composed of several different cohesively engaged thermoplastic materials. It is a further object of this invention to produce a multilayered article. A still further object of the invention is to produce by rotational molding a laminate. A further object of the invention is to produce a multilayered cohesively engaged, rotationally molded article. A more specific object of the invention is to produce a polyolefin laminate. A still more specific object of the invention is to produce a high impact resistance, high environmental stress cracking resistant, multilayered article from polymers and copolymers of olefins, especially of ethylene and propylene.

Other aspects, concepts, and objects of this invention are apparent from a study of this disclosure and the appended claims.

According to the present invention, there is formed a laminate, one layer being selected from a homopolymer and a copolymer of ethylene and another layer comprising essentially a copolymer of propylene and ethylene.

Presently, when ethylene copolymer is used, it is one containing at least one monomer selected from propylene and butene-1, and the comonomer selected is present in minor amount. Other 1-olefins, up to eight carbons, can be successfully incorporated in preparing ethylene copolymers which can be used according to the invention to form a cohesively engaged multilayered article.

For execution of the invention, in a now preferred form, the densities of the ethylene polymers and copolymers can range from about 0.94 grams per cubic centimeters upwards and their melt indexes are preferably greater than about 4, say 5-20. The comonomer presently preferred is 1-butene. Propylene as the comonomer gives copolymers with similar properties. The higher olefins, e.g., 1-hexene, 1-octene, when copolymerized with ethylene yield polymers with somewhat better environmental stress cracking resistance than the lower olefins but these polymers are also somewhat more expensive to prepare. Thus, the copolymer now preferred is an ethylene-1-butene copolymer having at least about 0.94 grams per cc. density and containing about 4-6 percent 1-butene. Generally, a range of from about 0.1 to about 5-7 percent of 1-butene or other comonomer is satisfactory for the preparation of an ethylene copolymer for use according to the invention.

Propylene-ethylene copolymer used will contain ordinarily not more than about 5 percent ethylene. The propylene-ethylene copolymers commonly used are random copolymers with ethylene contents ranging from about 0.1-5 percent. However, it is within the scope of the invention to use more ordered, so-called high impact or block copolymers of propylene and ethylene and the ethylene content of such polymers can range up to 20 percent or even higher. The densities of both types of copolymers are usually about 0.87 g./cc. or higher and their melt flows are preferably greater than 1, say 1.5-20.

Although the molds can be preheated, they are not normally preheated for rotational molding. Heating temperatures of the ovens in which the molds are heated vary from about 500° to 700° F. or even higher. Generally, a temperature of about 650° F. is found optimum when using the preferred plastics of the invention. Generally speaking, higher temperatures result in faster cycle times but can lead to resin degradation. At the higher temperatures the inert atmosphere which is used may nevertheless permit some degradation to occur, particularly if there is no stabilizer in the propylene-ethylene copolymer and care is not taken to insure the elimination of substantially all oxygen.

In the preparation of a high density polyethylene or ethylene copolymer containing articles with an approximate wall thickness of 0.08 inch as prepared in the examples given herein, the time is about 9 minutes at an oven temperature of about 650° F.

One skilled in the art will understand that thinner or thicker items require different heating periods depending upon the nature of the mold, the particle size of the polymer powder or particles which are used, etc.

It can be estimated that polypropylene requires about 25 to 30 percent longer heating cycle than does linear polyethylene.

Further, a dense, pourable material flows easily and fills all the nooks and crannies of the mold during the tumbling action, whereas very finely divided material such as talc, for example, tend to cling together and when an attempt is made to pour some from a container a batch will come out all at once, then none, then another batch, etc. This same action occurs in a mold with plastics and when it does, poorly molded articles will result. Accordingly, care must be taken in the execution of the invention to have a proper flowable or pourable powder or batch of particles.

Generally, the particle size of a resin for rotational molding can range from about 10 to about 400 in mesh size, 35-mesh regrind appearing to be a suitable grind for polyethylene and closely related copolymers. As one skilled in the art will understand, factors which influence particle size selection will include the resin type, melt index, stability and flowability of the resin. Naturally since thermoplastics are poor conductors of heat, the larger the particles the longer it takes to heat them to a suitable molding temperature. Long heating cycles should be avoided not only because of increased cost factor but because of polymer degradation which can occur.

Mesh sizes ranging from 16 to about 50 are quite suitable for rotational molding of polyethylene and closely similar polyolefins as herein described. All particles will be of substantially the same size for a given resin to provide the optimum performance and moldability.

The size of the particles can vary somewhat according to the variation in both density of the polymer and its relation to the softening temperature of the plastic. The Vicat softening temperature (ASTM D 1525–58T) for low density polyethylenes is around 193° F., for medium density polyethylenes it is around 225° F., for high density polyethylene it is around 250° F. and for polypropylene it is about 300° F.

Pellets of three-sixteenths density polyethylene and polypropylene usually cannot be depended upon to give a smooth-surfaced article when such is desired unless very high melt flow polymers are used. The term "pellet" is intended to include rod-shaped particles of about three-sixteenth inch long and about one-eighth inch in diameter. These particles are usually made by cutting a polymer strand.

In general, as the softening temperature of the resin increases, the heating cycle increases and the particle size will be decreased.

Polypropylene powder as it comes from a reactor can have a rather wide particle size distribution ranging from coarser than about 35 mesh to finer than 200 mesh. About 6 percent of the powder can be coarser than 100 mesh and 40 percent finer than 100 mesh. In the examples given herein the average particle size is at or about 80 mesh.

The proportions of polymer used for the outer inner skins in a two-layer laminate can be widely varied, depending upon the structure desired in the end product. For instance, in the examples in which 3-quart containers are rotationally molded, the outer skin can comprise from 25–80 percent by weight of the container. Experience has shown that 200 grams of polymer form a container with about 70-mil walls, the wall thickness desired for testing purposes. Hence, the weight of the ethylene polymer can vary from 50–160 grams and the weight of the inner propylene polymer can vary from 150–40 grams in this container. The thickness of the layers corresponding to these weights of polymer ranges from about 17–55 mils for the outer skin and 53–15 mil for the inner layer.

The heating cycle required for each layer is dependent upon the weight of polymer used. As more polymer is used, a longer heating time is necessary to fuse the material into a smooth coherent layer. To rotationally mold a two-layer container with the amounts of polymers previously mentioned, the heating time of the outer layer can consume from about 4 minutes for a 50-gram batch to about 9 minutes for a 160-gram batch. Similarly, the heating time required for the inner layer can take from about 4 minutes for a 40-gram batch to about 14 minutes for a 150-gram load.

In an air atmosphere polypropylene reactor product powder degrades rather quickly during heating and turns brownish even though the powder is heavily stabilized. It is difficult to protect with a stabilizer each and every particle of a finely divided polypropylene powder such as that received from the reactor in which it has been made. Consequently, portions of the polymer are not adequately stabilized and tend to degrade and turn brownish when heated in the presence of oxygen. Normally the stabilized powder is extruded and pelletized. This treatment serves to distribute the stabilizing system throughout the polymer, makes uniformly sized pellets, and reduces the surface area exposed when the pellets are remelted. These factors combine to lessen the sensitivity of the polymer to oxygen during another heating step. However, pellets of polypropylene polymers are generally not suitable for rotational molding because of relatively poor flow properties. In addition, it is both expensive and difficult to grind pellets of these polymers to a uniform mesh size. Therefore, presently it is preferred to mix the polymer powder as received from the reactor as uniformly as possible with the stabilizer system and to exclude oxygen during the lamination step by providing an inert atmosphere. Thus, the polymer will be stabilized ordinarily and an inert atmosphere will be provided to exclude oxygen.

EXAMPLE I

A conventional rotational molding apparatus and mold were used to make 3-quart capacity bottles. Rotational speeds used were 10 r.p.m. on the major axis and 20 r.p.m. on the minor axis, and a nitrogen purge was given the mold cavity before adding the polyethylene powder and again before adding the polypropylene powder. The polypropylene powders were mechanically mixed for 5 minutes with a suitable antioxidant system prior to their introduction into the mold.

Sixty-six grams of an ethylene-1-butene copolymer containing about 1 percent 1-butene (Marlex*(*Trademark) TR–880) with a nominal density of 0.955 g./cc. (ASTM D 1505–63T), 18-melt index (ASTM D 1238–62T, Condition E), and flexural modulus of 195,000 p.s.i. (ASTM D 790–63), ground to 35 mesh, was charged to the mold. The mold was closed, rotation was begun, and the mold was positioned in the oven, which was maintained at 550° F., for a 5-minute heating period to form the polyethylene skin. The mold was removed from the oven, rotation stopped and 134 grams was added of a random propylene-ethylene copolymer stabilized powder as it came from the reactor possessing nominal physical properties of 0.894 g./cc. density, 1.7 melt flow (ASTM D 1238–62T, Condition L), and a flexural modulus of 116,000 p.s.i. The Teflon plug was replaced, rotation resumed, the mold swung back into the oven and heated for 13 minutes more to form the inner layer. At the conclusion of the heating cycle, the mold was thereupon moved to the cooling chamber where it was exposed to water fog for 1½ minutes and finally to water spraying for 3 minutes. The mold was taken from the cooling chamber, rotation stopped and the mold was unfastened from the arm, opened and the article removed. Sections cut from the bottles were found to resist delamination well. The inner polypropylene layer was substantially white, indicating that degradation was minimal.

EXAMPLE II

Employing inert gas protection 66 grams of Marlex TR–960 was used for the first layer. This was ground to 35 mesh, with nominal physical properties of 0.962 g./cc. density, melt index of 6, and flexural modulus of 195,000 p.s.i., was charged to the mold. The second layer consists of 134 grams of a propylene-ethylene random copolymer with a 0.89 g./cc. density, 2.2 melt flow, and a flexural modulus of 110,000 p.s.i. Sections cut from the bottles were resistant to delamination.

EXAMPLE III

Employing inert gas protection 66 grams of an ethylene-propylene random copolymer ground to 35 mesh and possessing a 0.94 g./cc. density, 12-melt index and a flexural modulus of 125,000 p.s.i. is used for the first layer. One hundred and thirty-four grams of a propylene-ethylene random copolymer with a 1.9 melt flow, 0.89 g./cc. density and 114,000 p.s.i. flexural modulus is used for the inner layer. Sections cut from the bottles resist delamination.

Reasonable variation and modification are possible within the foregoing disclosure and the appended claims to the invention the essence of which is that there has been formed a laminate, as by rotational molding, one layer of which is constituted by a homopolymer and/or a copolymer of ethylene and another monomer and another layer of which comprises essentially a copolymer of propylene with ethylene; the laminate having the outer layer formed upon whatever heated surface is used, for example being formed upon the surface of whatever mold is employed.

I claim:

1. A method for molding a container having improved environmental stress cracking and impact resistance which comprises depositing in a mold in a rotational molding operation in which the mold is rotated about at least two axes; namely, a major axis and a minor axis, the speeds about said axes being respectively of the order of about 10 and about 20 r.p.m., a quantity of a powder of at least one of a homopolymer of ethylene and an ethylene copolymer with another monomer having a density of from about 0.94 g./cc. upwards and a melt index greater than about 4, heating said mold externally to form an outer skin layer and then depositing onto said layer during said operation a quantity of a powder of a propylene-ethylene copolymer containing not more than abut 20 percent ethylene, having a density of about 0.87 g./cc. and a melt flow greater than 1, continuing the heating of said mold and thus forming upon said outer skin layer an inner skin layer and cooling to solidify the said layers.

2. A method according to claim 1 wherein said operation is effected in an inert atmosphere.

3. A method according to claim 2 wherein said laminate is formed by rotational molding.

4. A method according to claim 3 wherein an ethylene-1-butene copolymer having from about 0.1 to about 5 percent of 1-butene therein and having a nominal density of about 0.94 is first formed in a heated rotational mold while said mold is rotating, the mold is then supplied with a propylene-ethylene copolymer in which the ethylene is present in an amount of from about 0.1 to about 5 percent, said propylene-ethylene copolymer having a nominal density of at least about 0.9 and the mold being under inert atmosphere conditions during the supplying and laying down of said propylene-ethylene copolymer.

5. A method according to claim 1 wherein an ethylene-1-butene copolymer having from about 0.1 to about 5 percent of 1-butene therein and having a nominal density of about 0.94 is first formed in a heated rotational mold while said mold is rotating, the mold is then supplied with a propylene-ethylene copolymer in which the ethylene is present in an amount of from about 0.1 to about 5 percent, said propylene-ethylene copolymer having a nominal density of at least about 0.9 and the mold being under inert atmosphere conditions during the supplying and laying down of said propylene-ethylene copolymer.

6. A method according to claim 1 wherein the operation is effected in an inert atmosphere by purging the mold cavity employed before adding the ethylene homopolymer or copolymer and again before adding the propylene-ethylene copolymer.

* * * * *